P. J. SIMMEN.
MECHANISM OR APPARATUS FOR CONTROLLING, RETARDING, AND ARRESTING THE MOTION OF ENGINES OR VEHICLES WHEN TRAVELING.
APPLICATION FILED APR. 14, 1908.
1,150,308.
Patented Aug. 17, 1915.
6 SHEETS—SHEET 1.
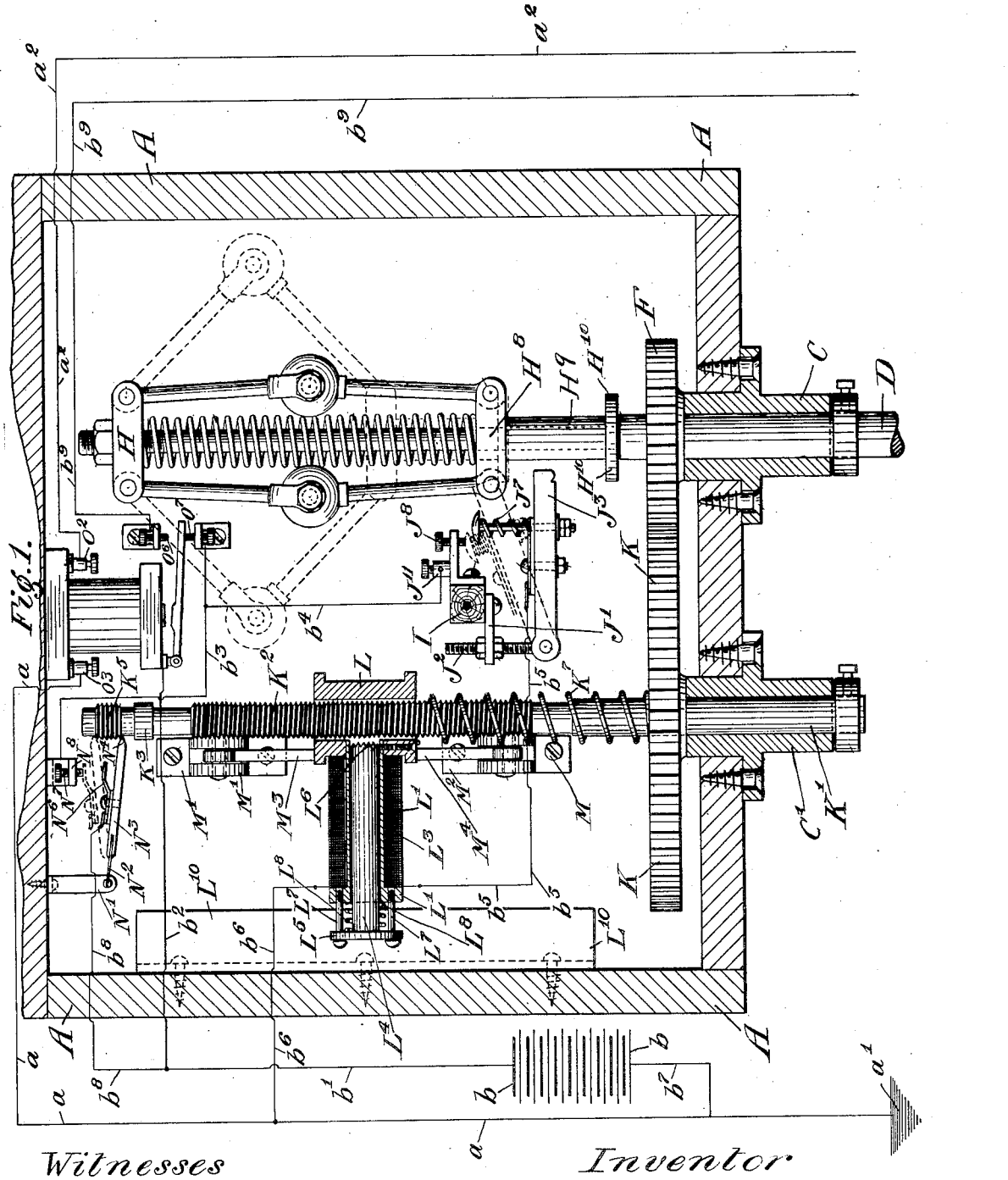
Witnesses
Rich. G. N. Mydston
Ida M. Daskam
Inventor
Paul J. Simmen.
St. John Day.
Attorney.

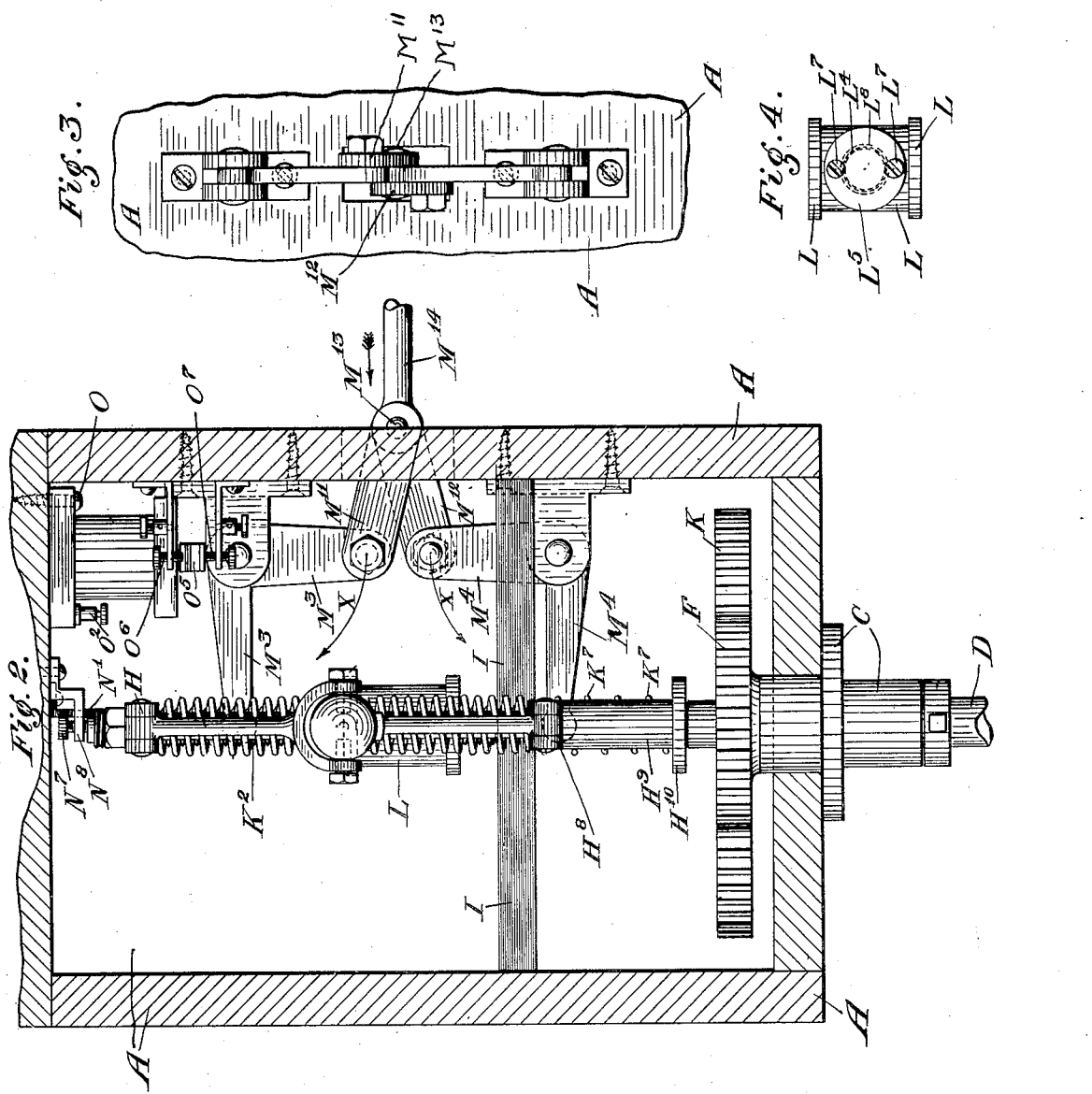

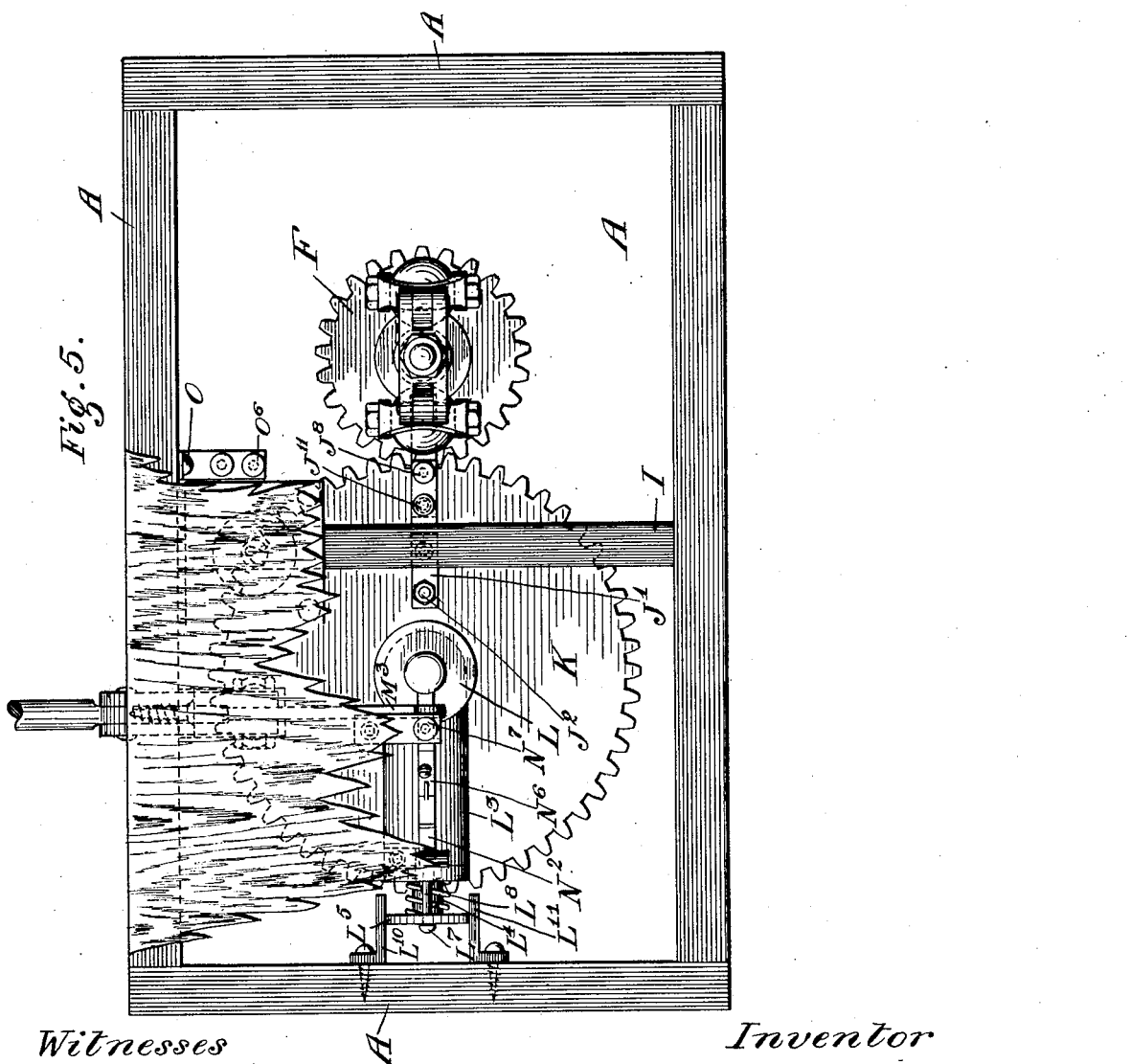

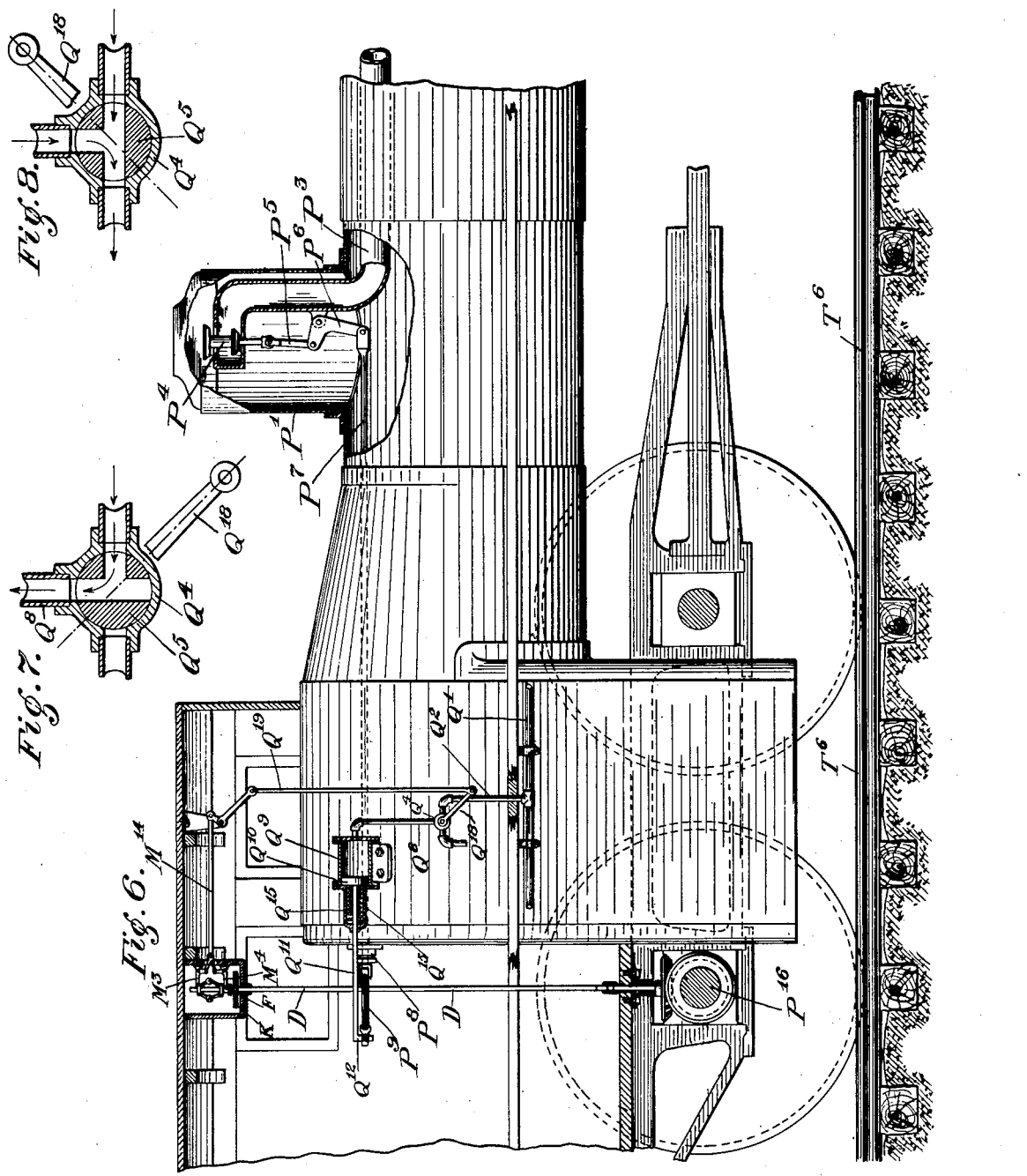

P. J. SIMMEN.
MECHANISM OR APPARATUS FOR CONTROLLING, RETARDING, AND ARRESTING THE MOTION OF ENGINES OR VEHICLES WHEN TRAVELING.
APPLICATION FILED APR. 14, 1908.
1,150,308. Patented Aug. 17, 1915.
6 SHEETS—SHEET 5.
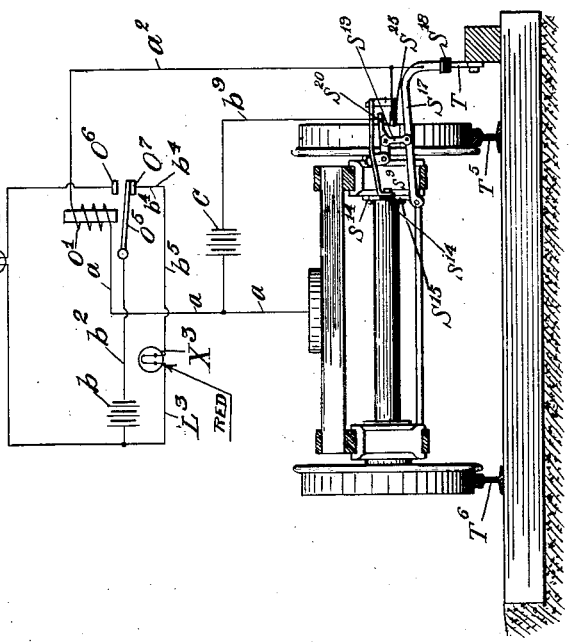
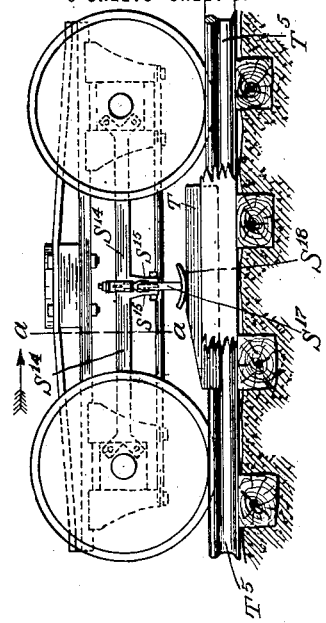
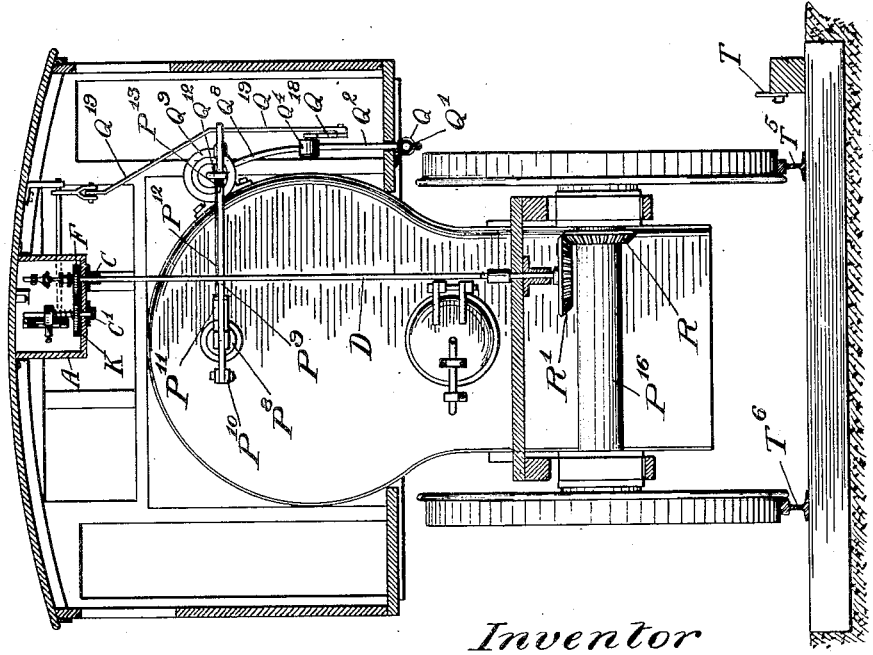
Witnesses
Inventor
Paul J. Simmen.
Attorney.

P. J. SIMMEN.
MECHANISM OR APPARATUS FOR CONTROLLING, RETARDING, AND ARRESTING THE MOTION OF ENGINES OR VEHICLES WHEN TRAVELING.
APPLICATION FILED APR. 14, 1908.
1,150,308.  Patented Aug. 17, 1915.
6 SHEETS—SHEET 6.
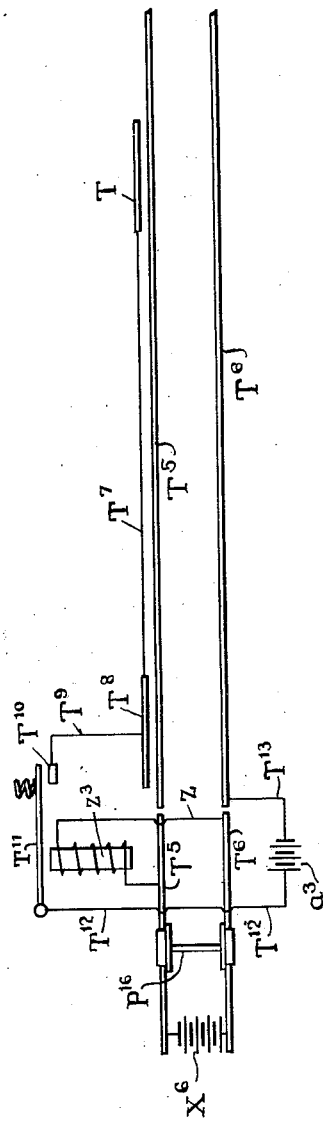
Fig. 12.
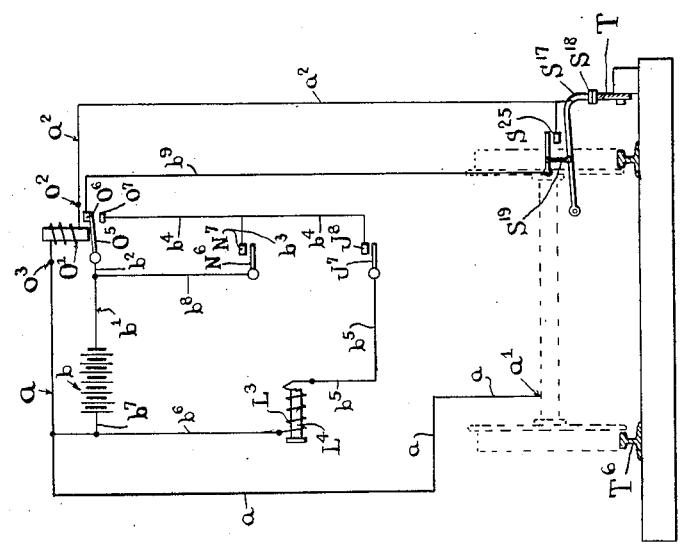
Fig. 14.
Fig. 13.
Witnesses
Inventor
Paul J. Simmen
By William R. Baird
Attorney

UNITED STATES PATENT OFFICE.

PAUL J. SIMMEN, OF LOS ANGELES, CALIFORNIA.

MECHANISM OR APPARATUS FOR CONTROLLING, RETARDING, AND ARRESTING THE MOTION OF ENGINES OR VEHICLES WHEN TRAVELING.

1,150,308.  Specification of Letters Patent.  Patented Aug. 17, 1915.

Application filed April 14, 1908. Serial No. 427,080.

*To all whom it may concern:*

Be it known that I, PAUL J. SIMMEN, of the city of Los Angeles, in the county of Los Angeles and State of California, have invented certain new and useful Improvements in Mechanism or Apparatus for Controlling, Retarding, and Arresting the Motion of Engines or Vehicles when Traveling, of which the following is a full, clear, and exact specification, reference being had to the annexed drawings and to the letters and figures marked thereon.

The drawings and specifications show the invention applied to a steam locomotive engine. The invention, however, is useful for any kind of engine or vehicle propelled by any motive power, such as electrically propelled cars on railways, or automobiles on highways.

The object of the invention is to control the speed of such vehicle and particularly to provide such a control if the person in charge thereof fails to observe danger, or other signals, which he should observe and whether the vehicle be traveling forward or backward. Its novelty consists in the construction and adaptation of the parts, as will be more fully hereinafter pointed out.

In the drawings, Figure 1 is a vertical section through a box containing the controlling devices and connected parts which are shown in elevation; Fig. 2 is a similar view taken on a plane at right angles to the section plane of Fig. 1; Fig. 3 is a detail of the connections to the propulsion control system; Fig. 4 is an end elevation of the controller solenoid; Fig. 5 is a plan of the parts beneath the box cover which is shown broken away in part; Fig. 6 is a side elevation and partial vertical section of a locomotive showing the manner of attaching and connecting several parts of the mechanism; Figs. 7 and 8 are enlarged sectional details of the air valve; Fig. 9 is an end elevation and partial vertical section through the locomotive cab; Fig. 10 is a side elevation of the locomotive truck and contact shoe; Fig. 11 is a section on the plane of the line $a-a$ in Fig. 10 and a diagram of the signal lamp circuit; and Fig. 12 is a similar diagram of the circuits used in connection with signal rails; Fig. 13 is a diagram of the cab circuits used in connection with the circuit of Fig. 12, and Fig. 14 is a detail of the automatic device for restoring the brakes and steam supply to their normal position.

In the drawings, A is a box adapted to contain parts of the apparatus and preferably secured at a convenient place within the cab of the locomotive by any suitable means. It is provided with a bearing C through which passes and in which rotates a spindle D rotated by means of a beveled gear R' secured thereto and meshing with a similar gear R secured upon one of the axles $P^{16}$ of the locomotive, (see Fig. 6). Above its bearing the spindle C is provided with a spur gear F and above that with a centrifugal governor H of usual form and the lower slidable member of which $H^8$ is extended to form a sleeve $H^9$ adapted to slide along a spindle and terminating in an expanded flange $H^{10}$. The box A is also provided with a bearing C' through which passes and in which rotates a spindle K' provided with a spur gear K which meshes with and receives motion from the gear F and which spindle is provided with threads indicated at $K^2$ for the major portion of its length. Above such threaded portion it is unthreaded and provided with an annular flange $K^3$ and above that with a short threaded portion $K^5$. A spring $K^7$ is coiled around a portion of the spindle for a purpose which will presently appear.

Adapted to surround the threaded portion of the spindle K' is a controller L in the form of a sleeve having a bore large enough to clear the threads $K^2$. It carries a projecting tube L' which should be made of non-magnetic material as brass, and surrounding which is a coil $L^3$ of insulated copper wire. Inside of the tube L' is a soft iron core $L^4$ having a flange $L^5$ at its outer end and teeth $L^6$ adapted to engage the threaded portion $K^2$ of the spindle K' at its inner end. Threaded into the outer end of the tube L' are screws $L^7$ which pass through holes in the flange $L^5$ and prevent any rotation of the core $L^4$ and keep its teeth in position to engage the threads $K^2$. A spring $L^8$ serves to keep the core normally out of such engagement. Guides $L^{10}$ and $L^{11}$ suitably secured to the sides of the box (see Fig. 5) prevent any rotation of the controller L during its vertical travel. It is obvious that when the coil $L^3$ is energized the core $L^4$ will move forward into threaded engagement with the spindle $K'$ and such engagement will cause the controller L to travel along the spindle. If such travel is upward and the coil is then deënergized the controller L will fall to its original position resting upon the spring $K^7$ coiled around the spindle for that purpose. If such travel is downward it will compress this spring and when the coil is deënergized the spring will lift the controller L to its original position.

Suitably pivoted on brackets $M'$ and $M^2$ secured to the side of the box A are bell crank levers $M^3$ and $M^4$, the horizontal arms of which extend across the path of the controller L in either direction and at points equidistant from its normal inactive position. When the coil $L^3$ is energized this controller will move upward or downward depending upon the direction of rotation of the spindle $K'$ which in turn depends upon the direction in which the locomotive is traveling. When the rotation of the spindle $K'$ has carried the controller far enough in either direction it will contact with the lever $M^3$ or $M^4$ as the case may be, and rock it on its pivot. Links $M^{11}$ and $M^{12}$ connect these levers by a common pivot $M^{13}$ with a rod $M^{14}$ so that a movement of the controller against either lever will pull the rod $M^{14}$ toward the controller. Attached to the rod $M^{14}$ is a collar $e$ (see Fig. 14), and between it and the side of the box A is arranged a helical spring $e^2$ which is compressed during the inward movement of the rod $M^{14}$ and which when the pressure of the controller L against the lever $M^3$ or the lever $M^4$ is released, will restore the rod $M^{14}$ to its original position. This collar $e$ may be moved along the rod $M^{14}$ and secured in place after such movement by means of the set screw provided for that purpose. Such movement will necessarily limit the distance between the terminal arms of the levers $M^3$ and $M^4$ and consequently will limit the extent of the travel of the controller.

Mounted at any convenient place on the locomotive is the usual train pipe $Q'$ (see Fig. 6) leading to the compressed air-brake system and provided with a branch $Q^2$ leading to a casing indicated at $Q^4$ and containing a three-way valve $Q^5$ (see Figs. 7 and 8) provided with a handle $Q^{18}$ adapted to be moved from the rod $M^{14}$ by means of a lever and link mechanism indicated at $Q^{19}$. From the casing $Q^4$ a pipe $Q^8$ leads to a compressed air cylinder $Q^9$ containing a piston $Q^{10}$ provided with a rod $Q^{11}$ terminating in a hook $Q^{12}$ adapted to engage a trip $P^{13}$. A coiled spring $Q^{15}$ tends to push the piston $Q^{10}$ toward the end of its cylinder against the pressure of the air therein.

$P^1$ is the steam dome of the locomotive, $P^3$ is the usual steam pipe therein leading to the cylinder.

$P^4$ is a throttle valve controlling the pipe $P^3$ and adapted to be moved by a valve rod $P^7$ through the lever and link mechanism indicated at $P^5$ and $P^6$. At its opposite end the rod $P^7$ passes through a stuffing box $P^8$ at the end of the boiler shell and is provided with the usual toothed quadrant $P^{11}$ (see Fig. 9). A latch $P^{12}$ is slidably mounted upon a lever $P^9$ pivoted to a link $P^{10}$ pivoted in turn to the rear end of the boiler shell and which latch is adapted to engage the quadrant $P^{11}$ whereby the throttle valve may be held in any desired position, the trip $P^{13}$ being adapted to withdraw the latch $P^{12}$ out of engagement with the quadrant $P^{11}$. The purpose of this whole mechanism is to control the steam supply through the valve $P^4$ and the brake system through the valve $Q^5$ whenever the movement of the controller L actuates the rod $M^{14}$ and to use the intermediate air cylinder $Q^9$ to magnify such movement to properly operate the rod $P^7$. When the rod $M^{14}$ is moved toward the cab the valve $Q^5$ is turned from the position shown in Fig. 7 to that shown in Fig. 8, which causes the air to escape from the pipe $Q^1$ and results in the application of the brakes. It also reduces the air pressure in the cylinder $Q^9$ and causes the rod $Q^{11}$ to move, and the hook $Q^{12}$ strikes the trip $P^{13}$ and withdraws the latch $P^{12}$ from the quadrant $P^{11}$, and moving the rod $P^7$ shuts off the steam from the cylinder of the locomotive.

Within the box A there is provided a support I of suitable insulating material to which is secured a bracket $J'$ on which is adjustably mounted a threaded rod $J^2$ to the lower end of which is pivoted a lever $J^3$ provided on its upper side with a compressible contact spring $J^7$ constituting an electric terminal. Also mounted on the support I is a threaded terminal $J^8$ and a binding post $J^{11}$ both insulated from the bracket $J^8$ but not from each other. The outer end of the lever $J^3$ is in the upward path of the flange $H^{10}$ of the governor H as it slides on the spindle D. An electric conductor $b^5$ leads to the terminal $J^7$, and another electric conductor $b^4$ leads to the terminal $J^8$ as hereinafter described.

Pivoted to a bracket $N'$ at the upper part of the box A is a flat spring $N^2$ carrying a lever $N^3$ provided at its outer end with a tooth $N^4$ adapted to engage the threads $K^5$ on the spindle $K'$, and also carrying an insulated contact spring $N^6$ constituting an electric terminal and adapted when moved upwardly to touch a contact screw $N^7$ secured within the box and which also constitutes an electric terminal. An electric conductor $b^8$ leads to the terminal $N^6$ and another electric conductor $b^3$ leads to the terminal $N^8$. Also secured at the top of the box is a relay O having terminals $O^2$ and $O^3$ and a pivoted armature $O^5$ adapted to move between contact screws $O^6$ and $O^7$ constituting electric terminals, the terminal $O^6$ being connected to the electric conductor $b^9$ and the terminal $O^7$ to the electrical conductor $b^4$, (see Figs. 1 and 12).

$T^5$ and $T^6$ are traction rails on which the wheels of the locomotive move. The track is divided into blocks and at suitable intervals and one pair for each block, there are arranged signal rails about a half a mile apart, each rail being about fifty feet long, one of the rails T is termed a caution rail and the other rail $T^8$ is termed a home rail. They are connected by a conductor $T^7$ (see Fig. 12) and are insulated from the traction rails and from the ground. Each of these rails are provided with a ramp or bevel at each end.

The locomotive is provided with a contact shoe and switch as follows: Suitably supported between two axle boxes on the locomotive truck is a bracket $S^{14}$ (see Fig. 10) having a depending member $S^{15}$ to which is pivoted a laterally extending lever $S^{17}$ (see Fig. 14) carrying a curved shoe $S^{18}$ adapted to contact with the signal rails T and $T^8$. Pivoted at any convenient place on the truck is a movable member $S^{20}$ adapted to be moved from the lever $S^{17}$ by a link $S^{19}$. This constitutes an electric terminal and is connected to the electrical conductor $b^9$. Also secured at a convenient place on the truck is a fixed member $S^{25}$ constituting an electric terminal connected to a small lead wire from a conductor $a^2$. These two members $S^{20}$ and $S^{25}$ constitute an electric switch. It will be understood that all of the parts are properly insulated to preserve their conductive functions.

The equipment comprising the shoe $S^{18}$ and terminals $S^{20}$ and $S^{25}$ is used for the purpose of opening and closing a local electrical circuit on the cab of the locomotive. Mounted at any convenient place on the locomotive is a local battery $b$ (see Figs. 1 and 13) from one side of which a conductor $b'$ leads to a second conductor $b^2$ connected to the armature $O^5$ of the relay $O'$, and also leads to a third conductor $b^8$ running to the terminal $N^6$. From the other side of the battery $b$ a conductor $b^6$ leads to the coil $L^3$ of the controller L and thence to a conductor $b^5$ which leads to the terminal $J^7$. From the terminal $O^7$ a conductor $b^4$ leads to the terminal $J^8$, a branch conductor $b^3$ leading to the terminal $N^7$. From the terminal $O^6$ a conductor $b^9$ leads to the terminal $S^{20}$ of the shoe switch. A conductor $a$ grounded at $a'$ by a connection with the axle of the locomotive or the like, is connected to the battery $b$ by a branch wire $b^7$ and leads to one terminal $O^3$ of the winding of the relay O, and a second conductor $a^2$ leads from the other terminal $O^2$ of the relay winding to the shoe $S^{18}$ with a branch to the fixed terminal $S^{25}$ of the shoe switch.

It will be understood that there is provided the usual continuous track circuit. This consists of the traction rails $T^5$ and $T^6$ divided into blocks as usual, and insulated from each other, a track battery $X^6$ (see Fig. 12) and a track relay $z^3$ connected by its winding to both traction rails and which relay is provided with an armature $T^{11}$. This relay when energized closes a circuit through a contact $T^{10}$ and when deënergized opens such circuit. The armature $T^{11}$ is normally in contact with the contact $T^{10}$ and the circuit referred to is closed. Whenever a wheel axle $P^{16}$ passes on to the rails $T^5$ and $T^6$ it forms a shunt circuit for the battery $X^6$, and the relay $z^3$ is deënergized and the armature $T^{11}$ ceases to contact with the member $T^{10}$ and opens the circuit referred to. This circuit which may be conveniently called "a control circuit" includes a battery $a^3$, one for each block or one centrally located with conductors $T^{12}$ leading to the armature of the track relay of each block. In Fig. 12 there is shown a local battery with a conductor $T^{12}$ leading to one end of the armature $T^{11}$ and another conductor $T^{13}$ leading from the opposite side of the battery $a^3$ to the ground $a^1$, or to one of the track rails $T^6$. From the terminal $T^{10}$ a conductor $T^9$ leads to the home rail $T^8$ whence a conductor $T^7$ leads to the caution rail T. The purpose of this track equipment is to energize the home and caution rails located at one block, when the block ahead is clear and to deënergize such rail when the block ahead is occupied by a train or is otherwise in a dangerous condition.

When one of the shoes $S^{18}$ is on a single rail T for instance, as shown in Fig. 13, the terminals $S^{20}$ and $S^{25}$ are separated and the switch is open. If the rail T is energized there will then be a flow of current from the battery $a^3$ through the conductor $T^{12}$, the armature $T^{11}$, the terminal $T^{10}$, the conductor $T^9$, the rail $T^8$, the conductor $T^7$, the rail T, and thence through the lever $S^{17}$ and conductor $a^2$ to the relay coil $O'$ and conductor $a$ to the vehicle axle $P^{16}$, or to the ground and thence to the opposite pole of the battery $a^3$. The result is that the armature $O^5$ is drawn into contact with the terminal $O^6$, and the cab circuit from the battery $b$ through the controller L remains open, and the speed of the locomotive is not controlled. This condition of the cab circuit is maintained as the shoe $S^{18}$ passes off of the signal rail T because the lever $S^{17}$ drops by gravity and closes the switch by causing a contact of the terminals $S^{20}$ and $S^{25}$. This establishes a circuit through the terminal $S^{25}$, the conductor $a^2$, the relay coil $O'$, the conductor $a$, the branch conductor $b^7$, the battery $b$, the conductors $b'$ and $b^2$, the armature $O^5$, the terminal $O^6$, and the conductor $b^9$ to the terminal $S^{20}$. This retains the armature $O^5$ in contact with the terminal $O^6$ and keeps open the cab circuit from the battery $b$ through the controller coil $L^3$.

Suppose now that the locomotive passes over a signal rail T which is deënergized. When the shoe $S^{18}$ contacts with such rail the lever $S^{17}$ is lifted and the terminal $S^{20}$ ceases to contact with the contact $S^{25}$, thus breaking the circuit from the battery $b$ through the relay $O'$. This relay is no longer energized through the conductor $a^2$ and the conductor $a$ because the rail T is no longer energized from the battery $a^3$. Therefore, the armature $O^5$ drops into contact with the terminal $O^7$ but no circuit is formed through the battery $b$ and the controller coil $L^3$ unless the terminals $J^7$ and $J^8$ are in contact and no contact of these terminals will exist unless the speed of the locomotive is sufficient to cause a rotation of the governor H to such an extent that the flange $H^{10}$ will contact with the lever $J^3$ and lift the terminal $J^7$ into contact with the terminal $J^8$. If such contact has taken place then a circuit is formed from the battery $b$ through the conductors $b'$ and $b^2$, the armature $O^5$, the terminal $O^7$, the conductor $b^4$, the terminals $J^8$ and $J^7$, the conductor $b^5$, the coil $L^3$ and the conductors $b^6$ and $b^7$, which circuit energizes the core $L^4$ and causes its teeth $L^6$ to engage the threads $K^2$ on its spindle and the controller L begins to travel along the spindle until it contacts with one of the levers $M^3$ or $M^4$ and through the rod $M^{14}$ operates the brake mechanism and shuts off the steam. The circuit through the coil $L^3$ is maintained after the shoe $S^{18}$ has passed off of the signal rail because the armature $O^5$ continues in contact with the terminal $O^7$ until the shoe $S^{18}$ again contacts with an energized rail which will cause a current to pass through the relay $O'$ as above described, and will lift the armature $O^5$ from the terminal $O^7$, or a reduction in the speed of the locomotive will cause the flange $H^{10}$ of the governor to fall below the lever $J^3$ and opens the switch constituted by the terminals $J^7$ and $J^8$. It should be noted, therefore, that the controller L is not set in motion unless a danger condition exists in connection with a speed above a predetermined limit. If a danger condition exists when the speed is not above such limit while it is true that the armature $O^5$ will be in contact with the terminal $O^7$, nevertheless, there will be no circuit through the controller coil $L^3$ until the terminals $J^7$ and $J^8$ are brought into contact by reason of the movement of the governor upward due to a speed sufficient to lift it to that point.

Suppose that the engineer sees the controller L begin to move, and before it contacts with the levers $M^3$ or $M^4$ reduces his speed. The result will be that as soon as the flange $H^{10}$ of the governor falls far enough to break the contact of the terminals $J^7$ and $J^8$ the circuit through the coil $L^3$ will be broken and the controller L will be returned to its normal position. If the engineer does not so act, then the controller will continue to move until it will contact with one of the bell crank levers $M^3$ or $M^4$ and will move the rod $M^{14}$ to put on the brakes and shut off the steam. In that case, the speed will be reduced and when lowered to a rate as predetermined, the flange $H^{10}$ will fall, the terminals $J^7$ and $J^8$ will separate, the controller L will be returned to its normal position, the bell crank levers will be returned to their normal position by the spring $e^2$, and the parts will be in operative condition as before. Should the engineer again increase his speed, while danger conditions continue to exist, as soon as the predetermined limit is reached the movement of the governor flange $H^{10}$ will cause the terminals $J^7$ and $J^8$ again to contact and the controller L will again be set in operation, and such actuation of the controller will take place so long as the danger conditions exist whenever the predetermined speed is exceeded.

It will be noted that the circuit through the terminals $J^7$ and $J^8$ is not established unless and until a predetermined speed is arrived at. It is obvious, however, that a mere change in the size or position of the lever $J^3$ for instance, by the adjustment of the screws $J^2$ or $J^8$, will suffice to reduce the predetermined speed limit to a very low one, or even to zero if desired. It will also be noted that the controller L does not act upon the levers $M^3$ or $M^4$ until it has traveled a certain distance along the spindle $K^5$ which distance is obviously a function of the distance traveled by the locomotive from the place where the speed limit was exceeded and the terminals $J^7$ and $J^8$ caused to contact with each other. It is therefore obvious that a mere change in the size or direction or position of these levers $M^3$ and $M^4$, or a mere change in the size of the controller sleeve L, or in its initial position on the spindle $K^8$, will suffice to reduce this distance to a very small quantity or to zero if desired. Therefore, by reducing the distance which the flange $H^{10}$ must travel before it contacts with the lever $J^3$, the controller will begin to move as soon as or almost as soon as, danger conditions exist, and by lengthening the controller L or changing the positions of the levers $M^3$ or $M^4$ as indicated, the controller will begin to act on the rod $M^{14}$ as soon as, or almost as soon as, the speed limit is exceeded.

It will be understood that the controller L is operated whether the locomotive is moving backward or forward. If moving forward the controller L is moved upwardly and if moving backward the controller L is moved downwardly by reason of the reverse movement of the wheel axles and of the spindle K'. When however a locomotive is backing danger is always presumed to be present whether the intermittent wayside control gives a danger impulse or not and therefore it is desirable to have the controller L actuated when the speed limit is exceeded whether the armature $O^5$ is in contact with the terminal $O^7$ or not. To that end there is provided the threads $K^5$ which are spirally arranged on the spindle K' in connection with $N^6$ and $N^7$. So long as the locomotive is moving forward, the tooth $N^4$ on the lever $N^3$ is pressed downward by the threads $K^5$ and the terminals $N^6$ and $N^7$ are kept apart, but when the locomotive is backing, the tooth $N^4$ engages the threads $K^5$ and the lever $N^3$ with its terminal $N^6$ is carried upward until it contacts with the terminal $N^7$. This establishes a circuit through the coil $L^3$ of the controller L just as soon as the terminals $J^7$ and $J^8$ are brought into contact when the speed limit is exceeded, such circuit being from the battery $b$ through the conductors $b'$ and $b^8$, the terminals $N^6$ and $N^7$, the conductors $b^3$ and $b^4$, the terminals $J^8$ and $J^7$, the conductor $b^5$, the coil $L^3$, the conductors $b^6$ and $b^7$ to the battery $b$ (see Fig. 13). As the position of the contact spring constituting the terminal $N^6$ is adjustable on the lever $N^3$ and the contact screw constituting the terminal $N^7$ is adjustable also, the time of the initial contact of the terminals $N^6$ and $N^7$ may be varied if desired.

It is obvious that if the controller L is within the range of vision of the operator he will know when it begins to move that danger conditions exist and the speed limit has been exceeded, but as the controller does not move until both of these conditions obtain, he would not otherwise be informed of the existence of danger conditions when the speed limit is not exceeded unless indeed the distance to be traveled by the flange $H^{10}$ before it caused the terminals $J^7$ and $J^8$ to contact were reduced to zero. It is desirable that he should be informed of the existence of danger conditions just as soon as they arise. When these conditions do arise the intermittent wayside control above described causes the deënergization of the relay O' and the swinging of the armature $O^5$ from contact with the terminal $O^6$ to contact with the terminal $O^7$. Advantage is taken of this to provide a visible danger signal to the operator and to that end a danger signal lamp $X^3$ conventionally colored red is placed in circuit with the battery $b$ and the terminal $O^7$ and a clear signal lamp $X^4$ conventionally colored green is placed in circuit with the battery $b$ and the terminal $O^6$ (see Fig. 11). Then normally with the armature $O^5$ in contact with the terminal $O^6$ the green lamp glows continuously whether the shoe $S^{18}$ is on an energized signal rail or beyond such rail, but as soon as danger conditions exist and the shoe $S^{18}$ contacts with and passes a deënergized signal rail, the armature $O^5$ contacts with the terminal $O^7$ and the red light glows.

In describing the electrical circuits used for the operation of the apparatus, I have hereinbefore referred to a closed circuit under a certain condition, and an open circuit under the reverse condition. It is evident that the opposite condition of the circuit will operate the opposite as well, so long as an electrical change in the circuit is produced. For instance, the circuit through the coil $L^3$, may be normally closed, the same being opened when a danger condition exists.

What I claim is:

1. A system of speed control for a locomotive moving along a trackway comprising means in the cab of the locomotive for indicating safety or danger, wayside means intermittently controlling said cab carried means, means for automatically causing the cab carried means so controlled to persist until changed by the wayside means, and means for automatically controlling the speed of the locomotive by the said cab carried means whenever the speed exceeds a predetermined limit and a danger condition is indicated by such means.

2. A system of speed control for a locomotive moving along a trackway comprising means in the cab of the locomotive for indicating safety or danger, wayside means intermittently controlling said cab carried means, means for automatically causing the cab carried means so controlled to persist until changed by the wayside means, means on the cab adapted to control the propulsion devices of the locomotive to vary its speed, and means adapted to be automatically controlled by the cab carried means to operate such control devices whenever such means indicate danger and the speed is excessive.

3. A system of speed control for a locomotive moving along a trackway, comprising means in the cab of the locomotive for indicating safety or danger, wayside means intermittently controlling said cab carried means, means for automatically causing the cab carried means so controlled to persist until changed by the wayside means, means on the cab adapted to control the propulsion devices of the locomotive to vary its speed, and means adapted to be automatically controlled by the danger indicating means to operate such control devices whenever such means indicate danger and the speed is excessive, and means for restoring normal conditions in such control devices whenever the danger indication ceases or the speed is reduced to a safe rate.

4. A system for controlling the speed of a locomotive, or the like, comprising a trackway along which the locomotive is adapted to travel divided into blocks, a device on the locomotive adapted when actuated to control its speed, an electric circuit on the locomotive including the controlling device and adapted when energized to actuate such device, an electrically operated device carried by the locomotive for controlling the circuit, and means in each block adapted to cause the energization of such controlling device whenever danger conditions exist in a block adjacent to the one on which the locomotive is traveling, and the locomotive is at the same time traveling at a speed greater than a predetermined minimum.

5. A system for controlling the movement of a vehicle along a trackway, divided into blocks, comprising devices adapted automatically to indicate a safe or danger condition in each block, separate means carried by the vehicle adapted to indicate safe or danger conditions, means for operating automatically the latter means from the former as the vehicle passes along the track, means for automatically maintaining the indication on the vehicle after its initial operation until it is changed by a change in the track indications and means adapted automatically to control the speed of the vehicle from the indicating means on the vehicle.

6. A controlling apparatus for a railway comprising a track divided into blocks, signal rails for each block, means for varying the electrical condition of such rails, depending upon the safe or danger condition of each block, a vehicle adapted to move along the track and provided with means for propelling and retarding it, in combination with means carried by the vehicle adapted automatically to shut off the propelling power and apply the retarding power whenever the electrical condition of the signal rails in the block along which the vehicle is traveling correspond to danger and the speed of the vehicle is excessive.

7. A controlling apparatus for a railway comprising a track divided into blocks, signal rails for each block, means for varying the electrical condition of such rails, depending upon the safe or danger condition of each block, a vehicle adapted to move along the track and provided with means for propelling and retarding it, in combination with means carried by the vehicle adapted automatically to shut off the propelling power and apply the retarding power whenever the electrical condition of the signal rails in the block along which the vehicle is traveling correspond to danger and the speed of the vehicle exceeds a predetermined limit and the vehicle has thereafter traveled a predetermined distance.

8. The combination with a locomotive provided with an air brake system, of a device for shutting off the steam and simultaneously putting on the brakes, comprising a threaded shaft operatively connected with the running gear of the locomotive, a threaded traveling controller normally held out of engagement with such shaft and means for automatically causing such engagement whenever the locomotive being in a danger zone, exceeds a predetermined speed.

9. The combination with a locomotive provided with an air brake system, of a device for shutting off the steam and simultaneously putting on the brakes, comprising a threaded shaft operatively connected with the running gear of the locomotive, a threaded controller adapted to engage such shaft and when so engaged to travel along the same and a connection with the steam supply and air supply of the brake system adapted to be moved from said controller at a predetermined point in its line of travel.

10. A track divided into blocks, signal rails for each block, means for energizing and deënergizing such rails, a steam locomotive adapted to move along the track, an air brake adapted to retard its movement, a governor on the locomotive moving in accordance with its actual speed, a device for controlling the admission of the steam to the locomotive cylinders, and for releasing the air from the brake system, and means controlled by a predetermined electrical condition of the rails for operating such device automatically whenever the locomotive passes into a danger zone along the track and the speed of the locomotive simultaneously exceeds a minimum rate.

11. A track divided into blocks, signal rails for each block, means for energizing and deënergizing such rails, a steam locomotive adapted to move along the track, an air brake adapted to retard its movement, a governor on the locomotive moving in accordance with its actual speed, a device for controlling the admission of the steam to the locomotive cylinders, and for releasing the air from the brake system, and means controlled by a predetermined electrical condition of the rails for operating such device automatically whenever the locomotive is in a danger zone and its speed exceeds a predetermined rate, after it has passed a predetermined distance.

12. In an apparatus of the character described, a device on a vehicle moved in accordance with its speed, a source of electrical energy carried by the vehicle, a movable terminal in circuit therewith and located in the path of the speed device whereby when the speed of the vehicle reaches a predetermined rate, contact is made with such terminal, and mechanism including wayside means for automatically making the circuit inactive under predetermined conditions.

13. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to move such control device whenever the speed of the vehicle exceeds a certain limit and other danger conditions exist.

14. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to operate such control device including a device on the cab adapted to indicate danger or safety conditions along the track in combination with means constituting a wayside control of such indicating means.

15. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance in either direction, whereby when so actuated the speed of the vehicle is reduced, and means for automatically restoring the parts to normal conditions when the speed of the vehicle is so reduced.

16. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance in either direction, whereby when so actuated the speed of the vehicle is reduced, and means adapted automatically to move such control device whenever the speed of the vehicle exceeds a certain limit and danger conditions exist, and means for automatically restoring the parts to normal conditions when the speed of the vehicle is so reduced.

17. The combination with a vehicle, of propelling and retarding mechanism, a controller for operating the same to reduce the speed of the vehicle, and means for moving the controller to an operating position, including a solenoid in the controller, an electrical circuit on the vehicle including said solenoid and normally open at two places, means for closing it at one place, including a circuit closer, means including devices outside of the vehicle for moving said circuit closer and indicating danger conditions along the track, and means for closing the electrical circuit on the vehicle at the second place, including the circuit closer and a device moving in accordance with the speed of the vehicle.

18. The combination with a vehicle, of propelling and retarding mechanism. a controller for operating the same to reduce the speed of the vehicle, and means for moving the controller to an operating position, including a solenoid in the controller, an electrical circuit on the vehicle including said solenoid and normally open at two places, means for closing it at one place by a current outside the vehicle including wayside controlling means having an intermittent operation, and means for closing it at the second place including a device carried by the vehicle and moved in accordance with its speed.

19. The combination with a vehicle, of propelling and retarding mechanism, a controller for operating the same to reduce the speed of the vehicle, and means for moving the controller to an operating position, including an electrical circuit on the vehicle, normally open at two places, a wayside device and means for electrifying said device, a second electrical circuit on the vehicle including an electro-magnet and means for supplying current to said second circuit from such wayside device, a circuit closer operated by said electro-magnet and closing the first electrical circuit on the vehicle in one place, means for closing such first electrical circuit at the second place including two terminals relatively movable into and out of coaction, and a governor on the vehicle for relatively moving said terminals.

20. The combination with a vehicle of propelling and retarding mechanism, a controller for operating the same to reduce the speed of the vehicle, and means for moving the controller to an operating position including a rotating threaded spindle, a solenoid secured to the controller and provided with a toothed core adapted to engage the spindle threads when the solenoid is energized.

21. The combination with a vehicle of propelling and retarding mechanism, a controller for operating the same to reduce the speed of the vehicle, and means for moving the controller to an operating position including a rotating threaded spindle, a solenoid secured to the controller and provided with a toothed core adapted to engage the spindle threads when the solenoid is energized and means for energizing the solenoid.

22. The combination with a vehicle, of propelling and retarding mechanism, a controller for operating the same to reduce the speed of the vehicle, and means for moving the controller to an operating position, including a rotating threaded spindle, a solenoid secured to the controller and provided with a toothed core adapted to engage the spindle threads when the solenoid is energized and means for energizing the solenoid consisting of a local circuit on the vehicle normally open at two places, means for closing the circuit at one place, including an electrical device on the vehicle, and trackside mechanism for intermittently energizing the device, and means for closing the circuit at the second place, including a speed governor on the vehicle.

23. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means including a movable member on the vehicle adapted automatically to move such control device whenever the speed of the vehicle exceeds a certain limit and other danger conditions exist, in combination with means for varying the extent of the movement of the control device.

24. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means including a movable member on the vehicle adapted automatically to move such control device whenever the speed of the vehicle exceeds a certain limit and other danger conditions exist, in combination with means for varying the distance between the initial position of the controller and its point of contact with the connection to the propelling and retarding mechanism.

25. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to move such control device whenever the speed of the vehicle exceeds a certain limit and other danger conditions exist, in combination with means to return the control device automatically to its original position whenever the danger condition ceases to exist.

26. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to move such control device whenever the speed of the vehicle exceeds a certain limit and other danger conditions exist, in combination with means to return the control device automatically to its original position whenever the speed of the vehicle is reduced below the certain limit.

27. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to operate such control device including a device movably mounted on the vehicle and trackside mechanism for controlling the movement of said controller by said device, in combination with means for varying the extent of the movement of the control device.

28. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to operate such control device including a device movably mounted on the vehicle and trackside mechanism for controlling the movement of said controller by said device, in combination with means for varying the distance between the initial position of the controller and its point of contact with the connection to the propelling and retarding mechanism.

29. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to operate such control device, including an electrical wayside means, means in the cab and intermittently operated by the wayside means for indicating safety or danger, and means for changing the nature of the indication according as danger or safety conditions exist outside of the vehicle, in combination with means to return the control device automatically to its original position whenever the danger condition ceases to exist.

30. An apparatus for controlling the speed of a moving vehicle provided with propelling and retarding mechanism, comprising a control device adapted to be moved in one direction, a connection with the propelling and retarding mechanism adapted to be actuated by the control device after the latter has moved a predetermined distance, whereby when so actuated the speed of the vehicle is reduced, and means adapted automatically to operate such control device, including an electrical wayside means, means in the cab and intermittently operated by the wayside means for indicating safety or danger, and means for changing the nature of the indication according as danger or safety conditions exist outside of the vehicle, in combination with means to return the control device automatically to its original position whenever the speed of the vehicle is reduced below a certain limit.

31. An apparatus for controlling the speed of a moving vehicle provided with propelling and retarding mechanism, comprising a control device adapted to be moved in either of two directions, a connection with the propelling and retarding mechanism adapted to be actuated by the control device after the latter has moved a predetermined distance in either direction, whereby when so actuated the speed of the vehicle is reduced, and means on the vehicle for thus moving the control device in combination with means for varying the extent of the movement of the control device.

32. An apparatus for controlling the speed of a moving vehicle provided with propelling and retarding mechanism, comprising a control device adapted to be moved in either of two directions, a connection with the propelling and retarding mechanism adapted to be actuated by the control device after the latter has moved a predetermined distance in either direction, whereby when so actuated the speed of the vehicle is reduced, and means on the vehicle for thus moving the control device in combination with means for varying the distance between the initial position of the controller and its point of contact with the connection to the propelling and retarding mechanism.

33. An apparatus for controlling the speed of a moving vehicle provided with propelling and retarding mechanism, comprising a control device adapted to be moved in either of two directions, a connection with the propelling and retarding mechanism adapted to be actuated by the control device after the latter has moved a predetermined distance in either direction, whereby when so actuated the speed of the vehicle is reduced, and means including a device on the vehicle adapted automatically to move such control device whenever the speed of the vehicle exceeds a certain limit and danger conditions exist, in combination with means for varying the extent of the movement of the control device.

34. An apparatus for controlling the speed of a moving vehicle provided with propelling and retarding mechanism, comprising a control device adapted to be moved in either of two directions, a connection with the propelling and retarding mechanism adapted to be actuated by the control device after the latter has moved a predetermined distance in either direction, whereby when so actuated the speed of the vehicle is reduced, and means including a device on the vehicle adapted automatically to move such control device whenever the speed of the vehicle exceeds a certain limit and danger conditions exist, in combination with means for varying the distance between the initial position of the controller and its point of contact with the connection to the propelling and retarding mechanism.

35. An apparatus for controlling the speed of a moving vehicle provided with propelling and retarding mechanism, comprising a control device adapted to be moved in either of two directions, a connection with the propelling and retarding mechanism adapted to be actuated by the control device after the latter has moved a predetermined distance in either direction, and means adapted automatically to move such control device whenever the speed of the vehicle exceeds a certain limit and the danger conditions exist, in combination with means to return the control device automatically to its original position whenever the danger condition ceases to exist.

36. An apparatus for controlling the speed of a moving vehicle provided with propelling and retarding mechanism, comprising a control device adapted to be moved in either of two directions, a connection with the propelling and retarding mechanism adapted to be actuated by the control device after the latter has moved a predetermined distance in either direction, and means adapted automatically to move such control device whenever the speed of the vehicle exceeds a certain limit and the danger conditions exist, in combination with means to return the control device automatically to its original position whenever the speed of the vehicle is reduced below the certain limit.

37. In an apparatus of the character described, the combination with a vehicle having running gear and propelling and retarding means, of a spindle D rotated from the running gear of the vehicle and carrying a governor H, a second spindle K' rotating in unison with the first spindle, a connection to the propelling and retarding mechanism of the vehicle including levers $M^3$ and $M^4$, a controller L adapted to slidably move along the spindle K' to contact either one of said levers and means for limiting the extent of its travel.

38. In an apparatus of the character described, the combination with a vehicle having running gear and steam supply mechanism, of a spindle D rotated from the running gear of the vehicle and carrying a governor H, a second spindle K' rotating in unison with the first spindle, a connection to the steam supply mechanism of the vehicle including a lever $M^3$, a controller L adapted to slidably move along the spindle K' to contact with said vehicle, and means for limiting the extent of its travel.

39. In an apparatus of the character described, the combination with a vehicle having running gear and brake mechanism of a spindle D rotated from the running gear of the vehicle and carrying a governor H, a second spindle K' rotating in unison with the first spindle, a connection to the brake mechanism of the vehicle including a lever $M^3$, a controller L adapted to slidably move along the spindle K' to contact with said lever and means for limiting the extent of its travel.

40. In an apparatus of the character described, the combination with a vehicle having running gear and steam supply and brake mechanism, of a spindle D rotated from the running gear of the vehicle and carrying a governor H, a second spindle K' rotating in unison with the first spindle, a connection to the steam supply and brake mechanism of the vehicle including levers $M^3$ and $M^4$, a controller L adapted to slidably move along the spindle K' to contact either one of said levers and means for limiting the extent of its travel including a stop flange $K^3$ on the spindle acting when the controller is moved in one direction and a spring $K^7$ coiled around the spindle acting when it is moved in the opposite direction.

41. In an apparatus of the character described, the combination with a vehicle having running gear and steam supply and brake mechanism, of a spindle D rotated from the running gear of the vehicle and carying a governor H, a second spindle K' rotating in unison with the first spindle, a connection to the steam supply and brake mechanism of the vehicle including levers $M^3$ and $M^4$, a controller L adapted to slidably move along the spindle K' to contact with either one of said levers and means for limiting the extent of its travel, in combination with means for automatically returning it to position when moved in either direction.

42. In an apparatus of the character described, the combination with a vehicle having running gear and steam supply and brake mechanism, of a spindle D rotated from the running gear of the vehicle and carrying a governor H, a second spindle K' rotating in unison with the first spindle, a connection to the steam supply and brake mechanism of the vehicle including levers $M^3$ or $M^4$, a controller L adapted to slidably move along the spindle K' to contact either one of said levers and means for limiting the extent of its travel, in combination with means for automatically returning it to position when moved in either direction including the force of gravity when it has been moved upward and a spring $K^7$ when it has been moved downward.

43. In an apparatus of the character described, the combination with a vehicle, of a rotatable spindle K' provided with threads, a controller L adapted to slide along the spindle, a traffic controlling device on the vehicle actuated by the controller, a toothed member carried by the controller and adapted to engage the threads and thereby move the controller when electrically energized and to disengage them when deënergized, and means for energizing the member.

44. In an apparatus of the character described, the combination with a vehicle of a rotatable spindle K' provided with threads, a controller L adapted to slide along the spindle, a traffic controlling device on the vehicle actuated by the controller, and a toothed member carried by the controller and adapted to engage the threads and thereby move the controller when electrically energized and to disengage them when deënergized, means for energizing the toothed member, and means adapted automatically to return the controller to its initial position when the toothed member is deënergized.

45. In an apparatus of the character described, the combination with a vehicle, of a rotatable spindle K' provided with threads, a controller L adapted to slide along the spindle, a traffic controlling device on the vehicle actuated by the controller, and a toothed member carried by the controller and adapted to engage the threads and thereby move the controller when electrically energized and to disengage them when deënergized, means for energizing the toothed member, and means adapted automatically to return the controller to its initial position when the toothed member is deënergized, including a spring $K^7$.

46. In an apparatus of the character described, the combination with a vehicle, of a rotatable spindle K' provided with threads, a controller L adapted to slide along the spindle, a traffic controlling device on the vehicle actuated by the controller, and a toothed member carried by the controller and adapted to engage the threads and thereby move the controller when electrically energized and to disengage them when deënergized, means for energizing the toothed member, means adapted automatically to return the controller to its initial position when the toothed member is deenergized and means for causing such electrical energization and deënergization carried by the vehicle.

47. In an apparatus of the character described, the combination with a vehicle of a rotatable spindle K', provided with threads, a traffic controller L adapted to slide along the spindle and a toothed member carried by the controller and adapted to engage the threads when electrically energized and to disengage them when deënergized, means for energizing the toothed member, and means adapted automatically to return the controller to its initial position when the toothed member is deënergized, and means for causing such electrical energization and deënergization carried by the vehicle including a local battery in circuit therewith, said circuit being normally open at two places.

48. In an apparatus of the character described, the combination with a vehicle, of a rotatable spindle K' provided with threads, a controller L adapted to slide along the spindle and a toothed member carried by the controller and adapted to engage the threads and thereby move the controller when electrically energized and to disengage them when deënergized, means adapted automatically to return the controller to its initial position when the toothed member is deënergized, and means for causing such electrical energization and deënergization carried by the vehicle including a local battery, a circuit including the battery, said circuit being normally open at two places, an armature $O^5$, a terminal $O^7$ and a relay O', means including elements outside of the vehicle for controlling said relay, and two terminals $J^7$ and $J^8$ and a centrifugal governor H co-acting therewith for closing the circuit at another place.

49. A system of speed control for a vehicle moving along a trackway, comprising means on the vehicle for governing its speed, mechanism for controlling the operation of the speed governing means, including a movable member on the vehicle and trackside means, means jointly controlled by said member and trackside means for actuating the controlling means when the vehicle is moving in one direction, and means for automatically actuating the controlling means independent of the trackside mechanism when the vehicle is moving in an opposite direction and the member assumes a predetermined position.

50. A system of speed control for a locomotive, comprising cab-carried circuit controlling means governed by the movement of the locomotive and independent of external influences, a circuit controlled thereby, a governor adapted to be moved in accordance with the speed of the locomotive, a speed controller in said circuit, and means governed by the movement of the governor for closing the circuit at another point.

51. The combination with a vehicle of propelling and retarding mechanism, a controller for operating the same to reduce the speed of the vehicle, and means for moving the controller to an operating position including an electrical circuit on the vehicle normally open at two places, and means for closing it at one place whenever the locomotive is moved backward and means for closing it at the second place including a circuit closer and a device moving the circuit closer and operated in accordance with the speed of the vehicle.

52. The combination with a vehicle of propelling and retarding mechanism, a controller for operating the same to reduce the speed of the vehicle, and means for moving the controller to an operating position including an electrical circuit on the vehicle normally open at two places, and means for closing it at one place whenever the locomotive is moved backward including two terminals normally kept apart at all other times, and means for closing it at a second place including two other terminals and a governor for operating the same.

53. The combination with a vehicle, of propelling and retarding mechanism, a controller for operating the same to reduce the speed of the vehicle, and means for moving the controller to an operating position, including a rotating threaded spindle, a solenoid secured to the controller and provided with a toothed core adapted to engage the spindle threads when the solenoid is energized, and means for energizing the solenoid consisting of a local circuit on the vehicle normally open at two places, and means for closing the circuit at one place including a governor on the vehicle and means for closing the circuit at another place including two terminals having a contact brought about by the rotation of the spindle in one direction when the locomotive is running backward.

54. In an apparatus of the character described, a movable controller comprising a sleeve, a solenoid secured thereto and moving therewith, a spindle adapted to be embraced by the sleeve and means for causing a moving engagement between the spindle and the solenoid to move the controller and including threads on the spindle and coöperating teeth on the core of the solenoid, and means for energizing the solenoid including an electrical circuit open at two places and means for closing it at one place comprising a fixed terminal and a movable terminal moved to contact with the same through the rotation of the spindle.

55. In an apparatus of the character described, a locomotive adapted to be moved forward or backward, a spindle moved from the running gear, two series of threads on the spindle spirally, a speed control device for the locomotive adapted to engage one series of the threads to move along the spindle when electrically energized, means for energizing the controller including an electric circuit and means coöperating with one series of threads for closing the circuit at one point whenever the locomotive is moved backward.

56. In an apparatus of the character described, a locomotive adapted to be moved forward or backward, a spindle moved from the running gear, two series of threads on the spindle spirally wound in opposite directions, a speed controlling device for the locomotive adapted to engage one series of the threads to move along the spindle when electrically energized, means for energizing the device including an electric circuit and means for closing the circuit at one point whenever the locomotive is moved backward including two terminals in the circuit and a device for moving them into contact actuated from the second series of threads on the spindle.

57. A system of speed control for vehicles moving along a trackway, comprising traffic controlling mechanism normally inactive, a device operating in accordance with the speed of the vehicle, trackside mechanism, means controlled by predetermined conditions in both the device and the trackside mechanism together, for causing the actuation of the traffic controlling mechanism, and means for automatically causing the actuation of the traffic controlling mechanism by said device independently of the trackside mechanism.

58. A system of speed control for vehicles moving along a trackway, comprising traffic controlling mechanism normally inactive, a device operating in accordance with the speed of the vehicle, trackside mechanism, means controlled by predetermined conditions in both the device and the trackside mechanism together, for causing the actuation of the traffic controlling mechanism when the vehicle is moving in one direction, and means for automatically causing the actuation of the traffic controlling mechanism by said device independently of the trackside mechanism when the vehicle is moving in an opposite direction.

59. A system of speed control for vehicles moving along a trackway, comprising traffic controlling mechanism normally inactive, a device operating in accordance with the speed of the vehicle, means under the control of said device for actuating the traffic controlling mechanism when the speed of the vehicle exceeds a predetermined limit, and trackside mechanism coacting with said actuating means for governing the control thereof by the said device when the vehicle is moving in one direction and being inactive when the vehicle is moving in an opposite direction.

60. The combination with a locomotive adapted to move forward or backward, of a system of speed control comprising a cab circuit, controlling elements in the circuit and means for automatically moving the elements into contact whenever the locomotive is moved in one direction, and means for automatically controlling the speed of the locomotive by such circuit and elements whenever a speed limit is exceeded, said automatic means separating the controlling elements upon the reversal of the direction of movement of the locomotive.

61. A system of speed control for a locomotive moving along a trackway, comprising a continuous cab control mechanism and wayside mechanism intermittently coöperating with the cab control mechanism for indicating danger conditions, and means for automatically controlling the speed of the locomotive from the cab control mechanism whenever danger conditions exist in the wayside mechanism and the speed exceeds a predetermined limit, in combination with means actuated from the trackside control mechanism by the cab control mechanism to produce a visible clear signal on the cab so long as no danger conditions exist.

62. A system of speed control for a locomotive moving along a trackway, comprising a continuous cab control mechanism and wayside mechanism intermittently coöperating with the cab control mechanism for indicating danger conditions, and means for automatically controlling the speed of the locomotive from the cab control mechanism whenever danger conditions exist in the wayside mechanism and the speed exceeds a predetermined limit, in combination with means actuated from the wayside control mechanism by the cab control mechanism to produce a visible danger signal on the cab whenever danger conditions arise.

63. A system of speed control for a locomotive moving along a trackway, comprising a continuous cab control mechanism and wayside mechanism intermittently coöperating with the cab control mechanism for indicating danger conditions, and means for automatically controlling the speed of the locomotive from the cab control mechanism whenever danger conditions exist in the wayside mechanism and the speed exceeds a predetermined limit, in combination with means actuated from the wayside control mechanism by the cab control mechanism to produce a visible clear signal on the cab so long as no danger conditions arise and automatically to change the clear signal to a danger signal whenever danger conditions arise.

64. A system of speed control for a locotive moving along a trackway, comprising a continuous cab control mechanism and wayside mechanism intermittently coöperating with the cab control mechanism for indicating danger conditions, and means for automatically controlling the speed of the locomotive from the cab control mechanism whenever danger conditions exist in the wayside mechanism and the speed exceeds a predetermined limit, in combination with means for normally indicating clear conditions, including a visible signal on the cab and a second visible signal for indicating danger conditions whenever they arise, said means also being for changing automatically from said visible clear signal on the cab when no danger exists to a visible danger signal when danger conditions arise and thereafter whenever the speed exceeds a predetermined limit operating said controlling means to automatically reduce the speed after the locomotive has moved a predetermined distance.

65. A system of speed control for a locomotive moving along a trackway, comprising a continuous cab control mechanism and wayside mechanism intermittently coöperating with the cab control mechanism for indicating danger conditions, and means for automatically controlling the speed of the locomotive from the cab control mechanism whenever danger conditions exist in the wayside mechanism and the speed exceeds a predetermined limit, in combination with means for normally indicating clear conditions, including a visible signal on the cab and a second visible signal for indicating danger conditions whenever they arise, said means also being for changing automatically from said visible clear signal on the cab when no danger exists to a visible danger signal when danger conditions arise and thereafter whenever the speed exceeds a predetermined limit operating said controlling means to automatically reduce the speed after the locomotive has moved a predetermined distance, and automatically restoring the controlling means to its inactive condition when the speed is reduced to a safe limit.

66. A system of speed control for a locomotive moving along a trackway, comprising a continuous cab control mechanism and wayside mechanism intermittently coöperating with the cab control mechanism for indicating danger conditions, and means for automatically controlling the speed of the locomotive from the cab control mechanism whenever danger conditions exist in the wayside mechanism and the speed exceeds a predetermined limit, in combination with means for normally indicating clear conditions, including a visible signal on the cab and a second visible signal for indicating danger conditions whenever they arise, said means also being for changing automatically from said visible clear signal on the cab when no danger exists to a visible danger signal when danger conditions arise and thereafter whenever the speed exceeds a predetermined limit operating said controlling means to automatically reduce the speed after the locomotive has moved a predetermined distance and automatically restoring the controlling means to its inactive condition when the speed is reduced and changing the visible danger signal to a visible clear signal as soon as the indications of danger have ceased.

67. In an apparatus of the character described, the combination with a controller adapted to act upon the steam supply and brake system of a locomotive, of means for moving it a predetermined distance from an intitial position before it is in a position to so act, and means for causing its initial movement whenever the speed of the locomotive is at a predetermined maximum, consisting of a governor moved in accordance with the speed of the vehicle, electric terminals adapted to be caused to contact by the movement of the governor at such maximum speed, a separable connection between the controller and the means by which it is moved, electrical means for controlling said connection, and an electric circuit including the terminals, a battery and said means.

68. In an apparatus of the character described, the combination with a controller L adapted to actuate a rod $M^{14}$, a toothed core $L^4$, carried by the controller, an electro-magnet for operating the core, a spindle $K'$ revolving with the running gear of a locomotive, and provided with threads adapted to be engaged by such core $L^4$, a battery $b$ and terminals $J^{70}$ and $J^{80}$ in circuit with the electro-magnet, and a governor H having a flange $H^{10}$ adapted when moved to a certain point to cause contact of the two terminals $J^{70}$ and $J^{80}$.

69. In an apparatus of the character described, the combination with a controller L adapted to actuate a rod $M^{14}$, a toothed core $L^4$, carried by the controller, an electro-magnet for operating the core, a spindle $K'$, revolving with the running gear of a locomotive, and provided with threads adapted to be engaged by such core $L^4$, a battery $b$ and terminals $J^{70}$ and $J^{80}$ in circuit with the electro-magnet, and a governor H having a flange $H^{10}$ adapted when moved to a certain point to cause contact of the two terminals $J^{70}$ and $J^{80}$, and elastic means to restore the rod $M^{14}$ to its original position when the circuit through the terminals is broken.

70. In an apparatus of the character described, the combination with a controller L adapted to actuate a rod $M^{14}$, a toothed core $L^4$, carried by the controller, an electro-magnet for operating the core, a spindle $K'$ revolving with the running gear of a locomotive, and provided with threads adapted to be engaged by such core $L^4$, a battery $b$ and terminals $J^{70}$ and $J^{80}$ in circuit with the electro-magnet, and a governor H having a flange $H^{10}$ adapted when moved to a certain point to cause contact of the two terminals $J^{70}$ and $J^{80}$, and means for automatically restoring the controller to its original position whenever the speed falls below the maximum.

71. In an apparatus of the character described, the combination with a controller L adapted to actuate a rod $M^{14}$, a toothed core $L^4$, carried by the controller, an electro-magnet for operating the core, a spindle $K'$ revolving with the running gear of a locomotive, and provided with threads adapted to be engaged by such core $L^4$, a battery $b$ and terminals $J^{70}$ and $J^{80}$ in circuit with the electro-magnet, and a governor H having a flange $H^{10}$ adapted when moved to a certain point to cause contact of the two terminals $J^{70}$ and $J^{80}$, and means for automatically restoring the controller to its original position whenever the speed falls below the maximum and contact between the terminals ceases.

72. In an apparatus of the character described, the combination with a controller L adapted to actuate a rod $M^{14}$, a toothed core $L^4$, carried by the controller, an electro-magnet for operating the core, a spindle $K'$ revolving with the running gear of a locomotive, and provided with threads adapted to be engaged by such core $L^4$, a battery $b$ and terminals $J^{70}$ and $J^{80}$ in circuit with the electro-magnet, and a governor H having a flange $H^{10}$ adapted when moved to a certain point to cause contact of the two terminals $J^{70}$ and $J^{80}$, and means for automatically restoring the controller to its original position whenever the speed falls below the maximum and means to restore the rod $M^{14}$ to its original position whenever the controller ceases to be moved.

73. In an apparatus of the character described, the combination with a controller L adapted to actuate a rod $M^{14}$, a toothed core $L^4$, carried by the controller, an electro-magnet for operating the core, a spindle $K'$ revolving with the running gear of a locomotive, and provided with threads adapted to be engaged by such core $L^4$, a battery $b$ and terminals $J^{70}$ and $J^{80}$ in circuit with the electro-magnet, and a governor H having a flange $H^{10}$ adapted when moved to a certain point to cause contact of the two terminals $J^{70}$ and $J^{80}$, and means for automatically restoring the controller to its original position whenever the speed falls below the maximum and means to restore the rod $M^{14}$ to its original position whenever the controller ceases to be moved, consisting of a spring $e^2$ adapted to be compressed when the rod $M^{14}$ is first moved.

74. A system of speed control for a vehicle moving along a trackway comprising wayside mechanism adapted to indicate danger or safe conditions for the vehicle, controlling mechanism on the vehicle coöperating intermittently with the trackside mechanism to receive danger and safe indications therefrom, and including means for automatically continuing said indications when out of coaction with the wayside mechanism, and means for automatically controlling the speed of the vehicle from the vehicle carried mechanism whenever the latter has been placed in a predetermined position by the wayside mechanism and the speed of the locomotive exceeds a predetermined limit.

75. A system of speed control for a vehicle moving along a trackway, comprising wayside mechanism adapted to indicate danger or safe conditions for the vehicle, controlling mechanism on the vehicle coöperating intermittently with the trackside mechanism to receive danger and safe indications therefrom and including means for automatically continuing said indications when out of coaction with the wayside mechanism, and means for automatically controlling the speed of the vehicle by the mechanism on the cab whenever the latter has been placed in a danger indicating condition and the speed of the locomotive exceeds a predetermined limit, said mechanism automatically permitting the vehicle to exceed said predetermined limit when the mechanism on the vehicle has received a safety or clear indication from the trackside mechanism.

In testimony whereof, I, PAUL J. SIMMEN, have hereunto set my hand and seal at the city of Los Angeles aforesaid, in the presence of two subscribing witnesses.

PAUL J. SIMMEN. [L. S.]

Witnesses:
St. JOHN DAY,
J. D. CORY.